(12) United States Patent
Verel et al.

(10) Patent No.: US 12,382,965 B2
(45) Date of Patent: Aug. 12, 2025

(54) METHOD FOR THE MANUFACTURE OF A BAKED COMESTIBLE

(71) Applicant: Generale Biscuit, Clamart (FR)

(72) Inventors: Aliette Verel, Clamart (FR); Faris M. Elbadri, Clamart (FR)

(73) Assignee: Generale Biscuit, Clamart (FR)

( * ) Notice: Subject to any disclaimer, the term of this patent is extended or adjusted under 35 U.S.C. 154(b) by 455 days.

(21) Appl. No.: 16/649,962

(22) PCT Filed: Oct. 10, 2018

(86) PCT No.: PCT/EP2018/077641
§ 371 (c)(1),
(2) Date: Mar. 23, 2020

(87) PCT Pub. No.: WO2019/072933
PCT Pub. Date: Apr. 18, 2019

(65) Prior Publication Data
US 2020/0305446 A1 Oct. 1, 2020

(30) Foreign Application Priority Data
Oct. 13, 2017 (EP) ..................... 17306393

(51) Int. Cl.
*A21D 6/00* (2025.01)
*A21D 8/02* (2006.01)
*A21D 13/06* (2017.01)

(52) U.S. Cl.
CPC ............. *A21D 6/003* (2013.01); *A21D 8/02* (2013.01); *A21D 13/06* (2013.01)

(58) Field of Classification Search
CPC . A21D 13/06; A21D 8/02; A21D 6/00; A21D 6/003
(Continued)

(56) References Cited

U.S. PATENT DOCUMENTS 8,507,462 B2    8/2013  Qi
8,568,820 B2   10/2013  Zikria
(Continued)

FOREIGN PATENT DOCUMENTS

CN    101117352    2/2008
CN    101731510    6/2010
(Continued)

OTHER PUBLICATIONS

Water Activity in Foods: Fundamentals and Applications Editor(s): Gustavo V. Barbosa-Cánovas, Anthony J. Fontana Jr., Shelly J. Schmidt, Theodore p. Labuza First published:Sep. 25, 2007 . Appendix pp. 407-409. (Year: 2007).*

(Continued)

*Primary Examiner* — Subbalakshmi Prakash
(74) *Attorney, Agent, or Firm* — Fitch, Even, Tabin & Flannery LLP

(57) ABSTRACT

The present invention relates to a method for the manufacture of a baked comestible product, the method comprising: i) forming and shaping a dough; ii) baking the shaped dough to form a baked comestible product; wherein the dough comprises a pre-treated flour, and wherein the pretreatment comprises: a) increasing a moisture content of a flour from an initial value to a value of from 12 to 25 wt % by weight of the flour; b) heating the flour in a sealed vessel to a temperature of from 80 to 120° C. for a period of at least 1 hour; and c) drying the flour to a final moisture content; wherein the final moisture content is in the range of +/−2 wt %, relative to the weight of the flour, of the initial value.

18 Claims, 1 Drawing Sheet

(58) Field of Classification Search
USPC .................................................. 426/549
See application file for complete search history.

(56) References Cited

U.S. PATENT DOCUMENTS

| | | | |
|---|---|---|---|
| 8,642,110 | B2 | 2/2014 | Abrahamse |
| 8,835,716 | B2 | 9/2014 | Frohberg |
| 9,247,763 | B2 | 2/2016 | Bouritius |
| 2010/0310747 | A1 | 12/2010 | Paulus |
| 2013/0337118 | A1 | 12/2013 | Sistrunk |
| 2014/0271992 | A1 | 9/2014 | Roberts |

FOREIGN PATENT DOCUMENTS

| | | |
|---|---|---|
| CN | 101914163 | 12/2010 |
| CN | 103621870 | 3/2014 |
| CN | 105431047 | 3/2016 |
| CN | 105820259 | 8/2016 |
| EP | 1362517 | 11/2003 |
| EP | 1362919 | 11/2003 |
| EP | 3078272 | 10/2016 |
| KR | 100836666 | 10/2007 |
| WO | 2015051228 | 4/2015 |
| WO | 2015051236 | 4/2015 |

OTHER PUBLICATIONS

Ahn, Ji Hong et al.; "Slowly Digestible Sweetpotato Flour: Preparation by Heat-moisture Treatment and Characterization of Physicochemical Properties"; Food Sci. Biotechnol. 22(2): pp. 383-391 (2013).

Chen, Xu et al.; In vitro digestion and physicochemical properties of wheat starch/flour modified by heat-moisture treatment; Journal of Cereal Science 63 (2015) pp. 109-115.

Collar, Concha et al.; " High-Legume Wheat-Based Matrices: Impact of High Pressure on Starch Hydrolysis and Firming Kinetics of Composite Breads"; Food and Bioprocess Tecnology, and International Journal; Springer-Verlag, New York; vol. 10, No. 6; Feb. 21, 2017; pp. 1103-1112.

International Search Report and Written Opinion of the International Searching Authority, date of mailing Nov. 7, 2018 for International Application No. PCT/EP2018/077641 (13 pgs.).

Lee, Chang Joo et al.; "Slowly digestible starch from heat-moisture treated waxy potato starch: Preparation, structural characteristics, and glucose response in mice"; Food Chemistry 133 (2012) pp. 1222-1229.

Miyazaki, M. et al.; "Effect of heat-moisture treated maize starch on the properties of dough and bread"; Food Research Interantional; Elsevier, Amsterdam, NL; vol. 38, No. 4; May 1, 2005; pp. 369-376.

Chung, Hyun-Jung, et al.; "Impact of annealing and heat-moisture treatment on rapidly digestible, slowly digestible and resistant starch levels in native and gelatinized corn, pea and lentil starches"; Carbohydrate Polymers, vol. 75; Dec. 31, 2009; pp. 436-447.

Notification of First Office Action (and English translation) dated Aug. 22, 2022, Chinese Patent Application No. 201880063748.2 (17 pgs.).

Notification of Third Office Action (and English translation) date of mail Jul. 31, 2023, Chinese Patent Application No. 201880063748.2 (18 pgs.).

Zhang, Er-Juan et la.; "Studies on digestibility of waxy corn starch by heat-moisture treatment"; Cereals & Oils, Dec. 31, 2009, Issue 6, pp. 20-22, with English translation.

* cited by examiner

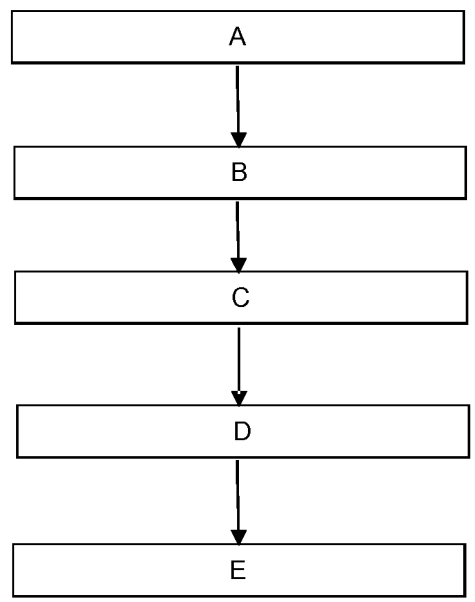

METHOD FOR THE MANUFACTURE OF A BAKED COMESTIBLE

CROSS REFERENCE TO RELATED APPLICATIONS

This application is a U.S. national phase application of International Application No. PCT/EP2018/077641, filed Oct. 10, 2018, which claims benefit from European Application 17306393.4, filed Oct. 13, 2017, which are each hereby incorporated herein by reference in their entirety.

The present invention relates to an improved baked comestible, in particular, a soft cake, which provides longer lasting energy to the consumer and to a method of producing the comestible. The method comprises a pre-treatment of the flour used to make the baked comestible.

Bakery products that provide a slow release of carbohydrates, and therefore have a long-lasting energy release, are believed to be beneficial for consumers' health. The presence of slowly available glucose (SAG), also known as slowly digestible starch (SDS), in these products is responsible for this long-lasting energy release. Bakery products typically comprise more SAG before baking than after baking. The amount of SAG typically decreases during the baking process due to the gelatinisation of the starch during the baking process. The gelatinisation occurs in part because of the presence of water in the dough mixture. Gelatinisation refers to the partial melting of the crystalline domains of starch, resulting in increased digestibility. During the heat treatment of moist dough the starch granules first swell, then progressively lose their crystalline structure until they burst, resulting in the leaching out of the polysaccharides contained in the granules (amylose and amylopectin).

In dry products such as biscuits, it may be possible to control the baking conditions and/or the ingredients in order to minimise the amount of SAG that is lost during the baking process. This approach is adopted in EP2720549. However, preparing products with a soft texture, such as soft cakes, presents technical challenges for the delivery of high levels of SAG. Such technical challenges may be related to the moisture content of the dough or batter (typically much higher than for biscuits), which can result in a breakdown of the native flour and starch matrix during baking and thereby provide a more rapidly digestible starch component. The inventors have therefore sought to provide a baked comestible product having a desirable, uniformly soft texture, while maintaining the high SAG levels that are possible with dry biscuits.

Cakes are well-known examples of soft bakery products and include, for example, brownies, sponges (such as a Victoria sponge cake or Madeira cake) and muffins. US 2013/0177676, for example, discloses a soft cake, such as a brownie-type pastry. U.S. Pat. No. 3,393,074 discloses a solid dessert having the texture of a freshly-baked cake. U.S. Pat. No. 4,350,713 discloses a sponge cake.

US2014271992 discloses a heat-treated flour.

EP1362517 and EP1362919 disclose slowly digestible starch products.

WO2015051236 discloses a breakfast biscuit with slowly available glucose.

WO2015051228 discloses a soft biscuit with slowly available glucose.

EP3078272 discloses a soft bakery product containing maltitol.

"Effect of heat-moisture treated maize starch on the properties of dough and bread", Miyazaki et al. Food Research International 38 (2005) 369-376, investigates the effects of HMT treatments.

"High-Legume Wheat-based Matrices: Impact of High Pressure on Starch Hydrolysis and Firming Kinetics of Composite Breads", Collar et. al. Food Bioprocess Technol. (2017) 10:11033-1112, investigates the effect of high hydrostatic pressure processing on wheat-replaced breads.

Accordingly, it is desirable to provide an improved baked comestible to tackle at least some of the problems associated with the prior art or, at least, to provide a commercially viable alternative thereto.

According to a first aspect the present invention provides a method for the manufacture of a baked comestible product, the method comprising:
 i) forming and shaping a dough;
 ii) baking the shaped dough to form a baked comestible product;
 wherein the dough comprises a pre-treated flour, and wherein the pretreatment comprises:
 a) increasing a moisture content of a flour from an initial value to a value of from 12 to 25 wt % by weight of the flour;
 b) heating the flour in a sealed vessel to a temperature of from 80 to 120° C. for a period of at least 1 hour; and
 c) drying the flour to a final moisture content;
 wherein the final moisture content is in the range of +/−2 wt %, relative to the weight of the flour, of the initial value.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present invention relates to a method for the manufacture of a baked comestible product. Baked comestible products, also known as bakery products, are well known in the art and include products such as biscuits, cookies and cakes. Preferably the present invention relates to a soft bakery product, and in particular, to a soft cake. Soft bakery products are baked, edible, cereal-based products and are well known in the art. Exemplary products include soft cakes, preferably cakes, cupcakes, sponge cakes, soft bars, brownies, but also brioche, croissants, buns, muffins, Swiss rolls, patisserie products such as tarts, plaits, and swirls, pain au chocolat, macaroons, flapjacks, doughnuts, pies, scones, éclairs, Mille-feuille, puddings, flans, tortes, pancakes, profiteroles, bread and bread-like products. The bakery product may be sweet or savoury.

Soft cakes are well known in the art and have a recognisable texture and consistency. Soft bakery products are characterised by a soft or tender texture. Conventional biscuits, which typically contain little moisture, have a crispy texture contrasting with that of a soft bakery product. That is, soft bakery products are not crispy or crunchy. One common identifier of a soft cake is the water activity (Aw) of the cake. Soft bakery products often have an intermediate or high level of water activity (Aw), as discussed below. This represents a measure of the moisture in the product which contributes to its soft texture. Preferably the Aw of the soft cake is from 0.65 to 0.85.

The baked comestible product described herein is preferably a single-portion sized product. A single portion is one to be consumed in a single sitting by a single person and will typically be individually wrapped.

The baked comestible product comprises a dough-based, baked portion. A dough is a thick, malleable, paste made out of cereals and water, and is a precursor to forming a baked component of a baked comestible product. The dough-based, baked portion is, therefore, a baked foodstuff which has been formed by baking a dough comprised of cereals. Such elements are well known components of the exemplary products listed above.

As will be appreciated, a baked comestible product is generally made in the steps of forming and shaping a dough, which is then baked to form the baked comestible product. As will be appreciated, while these steps are intended to be sequential, there may be some overlap between the steps when the process is carried out in a continuous manner.

Dough shaping can be performed by any known method including mixing and pressing, moulding and co-extruding. Other suitable techniques include sheeting and cutting. Baking of the dough is performed by known techniques in an oven to arrive at the baked comestible. Suitable baking conditions can be readily established by a person skilled in the art.

The dough used in the present invention to form the comestible product comprises a pre-treated flour. The flour has been pre-treated with an HMT treatment (Heat-moisture treatment). HMT is a type of hydrothermal treatment. Such treatments are known in the food industry and, in particular, for noodle manufacture. HMT involves the treatment of a material with moisture and heat for a set period of time.

HMT is distinct from annealing process (ANN). During ANN, starch granules with a high water content (>40% w/w) are held at a temperature of 20-55° C. for a set period of time. In contrast, HMT uses lower levels of water (<35% w/w) for a certain time at higher temperatures (such as 80-120° C.).

Importantly, the method is conducted on a flour, rather than a separated starch ingredient. The treatment of the flour allows for a cleaner product label (fewer ingredients) and a simpler manufacturing process due to the simplified recipe. The flour is discussed further below, but preferably the pre-treated flour comprises rice flour and/or wheat flour and preferably consists thereof.

The present inventors have found that HMT is able to change starch functionality at a low cost and in an environmentally friendly way (no chemical by-products). Surprisingly, even though the method involves conditions which might be expected to decrease the SDS content of the product, the inventors found that the products can have higher levels of SDS. In particular, the inventors found that the SDS of the treated flour per se decreased with HMT treatment, but that the SDS of the final product was, nonetheless, higher than with an untreated flour. Without wishing to be bound by theory, it is considered that the HMT treatment makes the starch more able to survive the cooking process in the moist dough conditions required to arrive at a soft cake.

The HMT pre-treatment comprises two key steps. In the first step, the moisture of the flour is increased from an initial value to a value of from 12 to 25 wt %. Preferably the moisture content of the flour is increased to a value of from 15 to 22 wt %, more preferably from 18 to 20 wt % and most preferably about 20 wt %. Preferably the moisture content of the flour is increased by adding water to the flour in a sealed vessel (i.e. air-tight) and allowing the flour and water to equilibrate. Typical flour has to a moisture of 14 wt % or below; the present method preferably involves an increase in the starting moisture of at least 1 wt %, preferably at least 2 wt % and typically from 6 to 10 wt %.

In the second step, the flour with the increased water content is heated to a temperature of from 80 to 120° C. for a period of at least 1 hour, in a sealed vessel. Preferably the flour is heated to a temperature of about 100° C., such as 95 to 105° C. Preferably the flour is heated for a period of from 3 to 48 hours, preferably 6 to 24 hours. The use of a sealed vessel means that the moisture content in the flour at the end of the process after being cooled back to room temperature is the same as the moisture content at the beginning of the process (after step (a)). The use of the sealed vessel therefore controls the moisture in the environment around the flour. The method could be carried out under a controlled atmosphere to keep the conditions and system moisture the same which would be equivalent to a sealed vessel. Preferably the pre-treatment is conducted in the same vessel used for moisture equilibration.

After the heat treatment step, the flour is then dried back to a value close to the original moisture content of the flour before step (a), i.e. the initial value. This allows the flour to then behave as expected in a conventional baking recipe. That is, the flour is dried to a final value which is in the range of +/−2 wt %, relative to the weight of the flour, of the initial value. Preferably the final value is in the range of +/−1 wt %, relative to the weight of the flour, of the initial value. By way of example, if the initial moisture of the flour is 13 wt % by weight of the flour, step (a) could increase the moisture value to 20 wt % by weight of the flour, and the drying step (c) could reduce the moisture back to a value between 11 and 15 wt %, preferably 12 to 14 wt %. Suitable drying processes are well known in the art, such as air-drying or heating under an open atmosphere.

The benefits of drying the heat-treated flour include an improvement in the ease of storing the treated flour, since too much moisture could lead to adverse microbiological growth issues. In addition if the moisture is too high then it would become harder to machine the dough.

Preferably the pre-treatment then comprises an optional milling step on the heat-treated flour to return the flour to a desired particle size and, in particular, to return the particle size distribution to substantially the pre-treatment particle size distribution. As will be appreciated, during the moisturising and heating steps the particle sizes can increase due to swelling. A typical median flour particle size is a d(0.5) of from 20 to 100 μm, preferably from 25 to 50 μm, and typically about 32 μm. Preferably the median flour particle size after treatment is within +200% and −66% of the initial median value, more preferably between +100% and −50% of the initial median value Preferably at least 50 wt % of a total flour content in the dough is the pre-treated flour, preferably at least 75 wt % and most preferably the total flour content in the dough is substantially entirely pre-treated flour. That is, the best effect on SDS is achieved when all of the flour has been subjected to HMT treatment.

Preferably, the baked comestible product comprises cereals in an amount of at least 35 wt %, more preferably at least 40 wt %, and preferably at most 80%. The cereals may be provided by flour and/or inclusions.

Suitable flour may include refined flour and/or whole grain flour. Wholegrain flour is understood to mean flour produced directly or indirectly from cereal whole grains comprising endosperm, bran and germ. Wholegrain flour may also be reconstituted from separate flours made from endosperm, bran and germ respectively in ratios that give the reconstituted wholegrain flour the same composition as wholegrain flour directly produced from grains that still retain bran and germ. Refined flour is understood to mean flour produced from cereal endosperm only.

Preferably the pre-treated flour comprises wholegrain flour, preferably in an amount of from 30 to 100 wt %, preferably from 50 to 80 wt %, by weight of a total flour content in the dough. Suitable types of wholegrain flours may include but are not limited to wholegrain wheat flour, wholegrain barley flour, wholegrain rye flour, wholegrain spelt flour, wholegrain buckwheat flour, wholegrain oat flour, wholegrain rice flour, wholegrain maize flour, wholegrain millet flour, wholegrain kamut flour, wholegrain sorghum flour, wholegrain teff flour, wholegrain triticale flour, and pseudocereal flour such as amaranth flour and quinoa flour, and mixtures thereof. Other sources of wholegrain cereals include wholegrain semolina and wholegrain cereal inclusions.

The most preferred flours are refined or whole grain wheat, or refined or whole grain rice flour, such as whole brown rice flour. Preferably the pre-treated flour comprises rice flour and/or wheat flour and preferably consists thereof.

Preferably, the baked comestible product comprises inclusions. An inclusion is understood to be a component of the baked comestible product that does not become part of the gluten or dough matrix, and may be visually distinguishable as an entity in a soft bakery product. Preferably, the inclusions are selected from the group consisting of flakes, groats, grits, cuts and mixtures of two or more thereof. Such ingredients may serve to trap moisture. Such inclusions may be sourced from various cereals or pseudocereals, for example, wheat, oat, corn, rye, barley, spelt, millet, sorghum, kamut, triticale, buckwheat, quinoa, and/or amaranth. The inclusion may be a whole grain cereal inclusion.

Flakes may be formed from any suitable grain, including wheat, rye, buckwheat, oats, barley, spelt, triticale, teff, millet, sorghum, quinoa, amaranth, kamut, durum wheat and combinations thereof or from any suitable legume such as garbanzo bean flakes or corn tapioca or sago flakes. The process of preparing flakes and specific processing conditions may depend on the botanical origin of flakes. Some flakes such as rye or barley or wheat may be understood to mean grains that are hydrated and/or steamed and/or heated, and rolled and thereby flattened into a grain flake. The flakes may consist of entire grain berries, such as whole oat flakes, medium oat flakes, quick cooking oats, or can be milled further to reduce their size.

Groats, grits and cuts may be formed from any suitable grain or seed, including oats, buckwheat, quinoa, amaranth, millet, wheat, barley, spelt, kamut, triticale, sorghum, corn, rye or combinations thereof.

The baked comestible product may further comprise non-starchy inclusions such as fruit, legumes, chocolate chips, nougat, caramel inclusions, crisps (protein, rice, etc.), any other suitable inclusion, or combinations thereof. Suitable fruit inclusions may include but are not limited to blueberries, strawberries, raspberries, bananas, peaches, raisins, cranberries and the like. These inclusions may provide textural, aesthetic, as well as nutritional benefits.

Preferably, the baked comestible product comprises fat, wherein the fat provides at most 35% of the total energy provided by the baked comestible product, preferably less than 30%, more preferably less than 25%, even more preferably less than 20%, and preferably at least 10%. Fat may be added to the cereal product from any suitable source, including but not limited to shortenings and oils. In some embodiments, a cereal product includes canola oil, high oleic canola oil, palm oil, soybean oil, sunflower oil, safflower oil, cottonseed oil, hydrogenated oils, transesterified oils or combinations thereof. The choice of the oil may depend on desired textural and nutritional properties of the cereal product.

As noted above, SAG refers to the amount of glucose (principally from starch, including maltodextrins, but also from sugar) likely to be available for slow absorption in the human small intestine. In the context of the present disclosure, the slowly digestible starch ("SDS") content equals the SAG content because there is no other SAG source than starch, i.e. SDS. Rapidly available glucose (RAG) refers to the amount of glucose likely to be available for rapid absorption in the human small intestine. A high level of SAG represents a good product with slow release energy.

SAG, as used herein, is defined and measured according to the Englyst method ("Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and to Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337).

In Englyst method, bakery samples are prepared by manually and roughly grinding one or more samples. The bakery samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labelled RAG. After an enzymatic digestion time of 120 min, glucose is again measured and is labelled available glucose (AG). SAG is obtained by subtracting RAG to AG (SAG=AG−RAG), thus, SAG corresponds to the glucose fraction released between the $20^{th}$ and the $120^{th}$ minute. Free glucose (FG), including the glucose released from sucrose, is obtained by separate analysis. RDS is then obtained as the subtraction of FG from RAG (RDS=RAG−FG). SAG content in a baked comestible product may be associated with the presence of ungelatinized starch. During processing of a cereal product, gelatinization of starch reduces the SAG content. Because starch gelatinization substantially increases in the presence of moisture, one established method of increasing SAG in a baked product is to use a minimal amount of water in a cereal product formulation; using lower amounts of water may result in lower levels of starch gelatinization, and therefore higher SAG levels in the finished product. However, a soft bakery product has less cereal than a biscuit, and therefore a smaller potential source of SAG. Moreover, the higher ratio of water to cereals in the dough means that the starch is more susceptible to gelatinization during the baking process. This effect is especially pronounced since soft bakery products are typically thicker than biscuits and require longer baking times, with the high-humidity baking conditions providing good conditions for starch gelatinization. Accordingly, achieving a high SAG content in a soft bakery product, as opposed to a biscuit, is particularly challenging.

Baking conditions for a soft cake require a longer time and a lower temperature compared to moist and crunchy biscuits. Usually the baking of a soft cake requires between 10-15 minutes at around 170° C. in order to obtain a desirable product moisture between 13-25%.

The baked comestible product of the present disclosure preferably has a slowly-available-glucose (SAG) content of at least 10 wt % and preferably at least 15 wt %. Such a product provides a long-lasting energy to the consumer. Preferably, the bakery product has a SAG content of from 10 to 40 wt %, more preferably from 15 to 35 wt %, still more preferably from 16 to 30 wt %, and most preferably from 16 to 25 wt %. High SAG levels ensure that the consumer has a long-lasting energy from the product.

The water activity (Aw) of a product is a notion which is well known in the food industry field. This value measures the availability of water in a sample. In most cases, this water activity is not proportional to the water content of the product. Methods for measuring Aw of a product are known to the person skilled in the art. For example, it can be measured with an Aqualab CX-2 or series 3, or a Novasina. All Aw values indicated hereafter are measured at 25±0.1° C. The Aw is measured of the freshly produced and packaged product.

The baked comestible product of the present disclosure has a water activity of from 0.6 to 0.9, preferably from 0.65 to 0.85 and most preferably 0.7 to 0.8. This water activity defines the product as a whole, including any coating or filling that may be present.

Preferably, the baked and packaged comestible product has a shelf life of at least 3 months at 20° C., more preferably at least 6 months, still more preferably at least 9 months.

According to a preferred embodiment, the invention provides a method for the manufacture of a soft cake, the method comprising:
 i) forming and shaping a dough;
 ii) baking the shaped dough to form a soft cake having a water activity (Aw) of from 0.65 to 0.85 and a SDS of at least 10 wt %, preferably at least 15 wt %, by weight of the soft cake,
 wherein the dough comprises a pre-treated flour, and wherein the pretreatment comprises:
 a) increasing a moisture content of a flour from an initial value to a value of from 18 to 22 wt %, preferably about 20 wt %;
 b) heating the flour in a sealed vessel to a temperature of from 80 to 120° C., preferably about 100° C., for a defined period; and
 c) drying the flour to a final moisture content;
 wherein the final moisture content is in the range of +/−2 wt %, relative to the weight of the flour, of the initial value.
 wherein:
 (I) the pre-treated flour is a wheat flour and the defined period is from 6 to 24 hours; or
 (II) the pre-treated flour is a rice flour and the defined period is from 1 to 24 hours.

According to a further aspect there is provided a baked comestible product obtainable according to the method described herein, especially a soft cake product, comprising a continuous bakery portion and, optionally, one or more inclusions, wherein the continuous bakery portion has a total starch content comprising a slowly-digestible starch content (SDS), wherein the SDS is at least 10 wt % by weight of the product. Preferably the baked comestible is a soft cake.

A continuous bakery portion means a baked product, such as a cake or biscuit (or others as described herein), which forms the structure of and, typically, the majority of a product. It is distinct from a product containing a plurality of bakery portion fragments. In the present case the continuous bakery portion provides the structure and may have one or more inclusions embedded in the continuous portion as discontinuous inclusions.

Preferably the baked comestible comprises from 5 to 20 wt % fat; and/or less than 30 wt % sugar. This ensures that the final product is a healthy baked comestible.

According to a further aspect there is provided the use of a pre-treated flour in a dough to increase the slowly digestible starch (SDS) content of a baked comestible product, wherein the pre-treatment comprises:
 a) increasing a moisture content of a flour from an initial value to a value of from 12 to 25 wt % by weight of the flour;
 b) heating the flour in a sealed vessel to a temperature of from 80 to 120° C. for a period of at least 1 hour; and
 c) drying the flour to a final moisture content;
 wherein the final moisture content is in the range of +/−2 wt %, relative to the weight of the flour, of the initial value.

FIGURES

The present disclosure will be described in relation to the following non-limiting figures, in which:

FIG. 1 is a flow chart of the steps in accordance with the method disclosed herein.

In this flow chart, the steps are as-follows:
 A—Providing a flour having a starting (conventional) particle size and starting (conventional) moisture;
 B—Adjusting the flour moisture by adding water to the flour in a sealed container and allowing equilibration;
 C—Placing the container in oven and baking;
 D—Milling the flour back to the original particle size;
 E—Drying the flour down to a moisture level close to the original.

EXAMPLES

The invention will now be described further in relation to the following non-limiting examples.

Flour for use in the following trials was prepared using the HMT flour process discussed herein. The steps in the HMT process were as follows:
 1. Flour was provided (with certain % moisture (Variable 0) and particle size distribution)
 2. Adjust moisture (Variable 1). Seal container and equilibrate.
 3. Place container in oven at a certain temperature (Variable 2) for a set period of time (Variable 3).
 4. Open container, and mill flour back to the original particle size if needed.
 5. Dry flour down to a moisture level close to the original
 6. Use the flour to make bakery products and measure starch digestibility.

Example 1

This example demonstrates that the use of HMT flour is relevant only on soft cake products, and not on so-called moist products and crunchy biscuits:

The texture of a bakery product is mainly driven by the moisture and the water activity of the bakery product. Three different kinds of bakery products were tested and the recipes are provided below. One product was prepared in each of the following three categories: crunchy biscuit, moist product and soft cake.

|  | Crunchy Biscuit | Moist Product | Soft cake |
| --- | --- | --- | --- |
| Water Activity | Less than 0.1-0.4 | 0.4-0.65 | 0.65-0.85 |
| Moisture | 0.5%-5.0% | 5.0%-13.0% | 13%-25% |

The flour used in this example was a refined wheat flour. The HMT conditions were as follows:

| Flour | Before HMT | Heat Moisture Treatment | | |
| --- | --- | --- | --- | --- |
|  | Variable 0 Flour Moisture before Treatment | Variable 1 Flour Moisture | Variable 2 Heating Temperature | Variable 3 Heating Time |
| Control (no treatment) | 13% | Na | Na | Na |
| HMT Flour Trial | 13% | 20% | 100° C. | 16 h |

The flour granulometry (d(0.5) values) were: 1) Control: 32 μm; and 2) HMT Flour trial (after treatment): 89 μm The particle size is the median particle size by volume, and is measured in particular by laser diffraction with a Malvern Mastersizer 2000 apparatus combined with a SCI-ROCCO auto-sampler. The apparatus measures the volume occupied by each particle. As the particles are not strictly spherical, the apparatus approximates an equivalent sphere acting in the same manner as the particle considered. This is the most common laser diffraction particle size measurement.

The following table shows the SDS of the refined wheat flour before and after HMT treatment:

|  | SDS |
| --- | --- |
| Control (no treatment) | 50.1%-50.8% |
| HMT flour trial | 44.0%-44.2% |

The SDS value of the HMT flour is below the SDS value of the Control. This shows that it was not obvious to use the HMT flour in a trial in order to increase the SDS value of a soft cake.

1. Soft Cake

| Control | HMT Flour Trial | % in dough |
| --- | --- | --- |
| Refined Wheat Flour | HMT Refined wheat flour (Moisture: 20% - Heating: 100° C. - Heating time: 16 hours) | 36.30 |
|  | Starch | 6.35 |
|  | Wheat Bran & germ | 0.90 |
|  | Sugar | 15.43 |
|  | Leavening Agents | 0.55 |
|  | Salt | 0.17 |
|  | Flavouring | 0.05 |
|  | Polydextrose | 6.35 |
|  | Glycerin | 5.71 |
|  | Water | 5.90 |
|  | Eggs | 12.41 |
|  | Oil & Emulsifiers | 9.88 |
|  | Total before baking | 100.00 |

The baked dough products were prepared with the compositions described above, according to the following steps:

The dry ingredients were introduced into a Hobart mixer equipped with a leaf-type mixer, then mixed for 2 minutes at speed 1, corresponding to a planetary movement of 48 rpm.

The liquids were added to the mixer, mixed for 1 minute 30 seconds at speed 1, then mixed again for 1 minute 30 seconds at speed 2, corresponding to a planetary movement of 88 rpm.

The oil and emulsifiers were added to the mixture obtained above and kept under agitation at speed 2 for 1 minute and 30 seconds.

The dough obtained was allowed to rest for at least 30 minutes.

Using a pastry bag, the dough obtained above was piped into molds, each having a capacity of 35 grams.

The molds were placed in a Polin oven at 170° C. for 11 minutes.

The characteristics of the baked soft cake are summarised below:

|  | Control | HMT Flour Trial |
| --- | --- | --- |
| Moisture | 16.2% | 15.9% |
| Water Activity | 0.71 | 0.70 |
| SDS | 4.9% | 11.1% |

This shows that the use of a HMT Refined wheat flour (Moisture: 20%—Heating: 100° C.—Heating time: 16 hours) in a soft cake allows a strong increase (+126%) in the SDS value compared to the Control.

2. Moist Product

| Control | HMT Flour Trial | % in dough |
| --- | --- | --- |
| Refined Wheat Flour | HMT Refined wheat flour (Moisture: 20% - Heating: 100° C. - Heating time: 16 hours) | 24.2 |
|  | Sugars, inulin and polyols | 22.2 |
|  | Buckwheat grits | 14.6 |
|  | Oil & Emulsifiers | 11.1 |
|  | Water | 8.3 |
|  | Starch | 5.9 |
|  | Cereal Crisps | 5.0 |
|  | Glycerin | 4.5 |
|  | Barley and spelt flours | 2.0 |
|  | Flakes | 1.0 |
|  | Leavening agent | 0.4 |
|  | Salt | 0.3 |
|  | Flavouring | 0.3 |
|  | Wheat bran & germ | 0.2 |
|  | Total before baking | 100.0 |

The dough was prepared by mixing all ingredients in a planetary mixer (Hobart) using the following sequence:

|  | Speed | Time (min) |
| --- | --- | --- |
| 1/Liquids | 1 | 1 |
| 2/Powders | 2 | 2 |
| 3/Cereals | 1 | 2 |
| 4/Inclusions | 1 | 1 |

After a resting time of at least 30 minutes the dough was formed using a wire cut equipment. Pieces of 50 grams were then produced and baked at 180° C. for 8 minutes and 30 seconds in a Polin oven.

The characteristics of the Baked Moist product are set out in the table below:

|  | Control | HMT Flour Trial |
|---|---|---|
| Moisture | 10.9% | 10.3% |
| Water Activity | 0.59 | 0.58 |
| SDS | 17.4% | 17.3% |

This demonstrates that the use of a HMT Refined wheat flour (Moisture: 20%—Heating: 100° C.—Heating time: 16 hours) in a so-called "moist" product does not allow an increase in the SDS value versus the Control.

3. Crunchy Biscuit

| Ingredients | Control | HMT Flour Trial (Moisture: 20% - Heating: 100° C. - Heating time: 16 hours) |
|---|---|---|
| Refined wheat Flour | 36.40% | 36.20% |
| Sugar | 21.10% | 21.10% |
| Oil | 11.40% | 11.40% |
| Water | 9.40% | 9.60% |
| Flakes | 6.80% | 6.80% |
| Whole rye flour | 3.30% | 3.30% |
| Whole barley flour | 3.30% | 3.30% |
| Wheat bran | 3.30% | 3.30% |
| Cocoa powder | 3.30% | 3.30% |
| Leavening agents | 1.20% | 1.20% |
| Salt | 0.30% | 0.30% |
| Emulsifier | 0.20% | 0.20% |
| Total before baking | 100.00% | 100.00% |

The ingredients of the dough were mixed together in a horizontal mixer until the dough gets a homogenized consistency. Then the dough was rested for 30 minutes. After resting, the dough was fed into the hopper of the rotary moulder for forming the biscuits which were baked at 180° C. for about 7 minutes.

The characteristics of the baked Crunchy biscuit product are set out in the table below:

|  | Control | HMT Flour Trial |
|---|---|---|
| Moisture | 1.9% | 1.5% |
| Water Activity | Less than 0.1 | Less than 0.1 |
| SDS | 21.5% | 20.6% |

This demonstrates that the use of a HMT Refined wheat flour (Moisture: 20%—Heating: 100° C.—Heating time: 16 hours) in a crunchy biscuit does not allow an increase in the SDS value compared to the Control.

Example 2

This example shows that the use of an HMT process on a Whole Brown Rice Flour allows the provision of a soft cake having a Slowly Digestible Starch above 15%. This is much higher than has previously be achieved in such a product.

The flour in this trial was Whole Brown Rice Flour. The HMT flour conditions were:

|  | Before HMT | Heat Moisture Treatment | | |
|---|---|---|---|---|
| Flour | Variable 0 Flour Moisture before Treatment | Variable 1 Flour Moisture | Variable 2 Heating Temperature | Variable 3 Heating Time |
| Control (no treatment) | 11.7% | Na | Na | Na |
| HMT Flour Trial | 11.7% | 20% | 100° C. | 16 h |

1. Soft Cake:

| Control | HMT Flour Trial | % in dough |
|---|---|---|
| Whole Brown Rice Flour | HMT Whole Brown Rice Flour (Moisture: 20% - Heating: 100° C. - Heating time: 16 hours) | 36.30 |
|  | Starch | 6.35 |
|  | Wheat Bran & germ | 0.90 |
|  | Sugar | 15.43 |
|  | Leavening Agents | 0.55 |
|  | Salt | 0.17 |
|  | Flavouring | 0.05 |
|  | Polydextrose | 6.35 |
|  | Glycerin | 5.71 |
|  | Water | 5.90 |
|  | Eggs | 12.41 |
|  | Oil & Emulsifiers | 9.88 |
|  | Total before baking | 100.00 |

Baked dough products were prepared with the compositions described above, according to the following steps:
- The dry ingredients were introduced into a Hobart mixer equipped with a leaf-type mixer, then mixed for 2 minutes at speed 1, corresponding to a planetary movement of 48 rpm.
- The liquids were added to the mixer, mixed for 1 minute 30 seconds at speed 1, then mixed again for 1 minute 30 seconds at speed 2, corresponding to a planetary movement of 88 rpm.
- The oil and emulsifiers were added to the mixture obtained above and kept under agitation at speed 2 for 1 minute and 30 seconds.
- The dough obtained was allowed to rest for at least 30 minutes.
- Using a pastry bag, the dough obtained above was piped into molds, each having a capacity of 35 grams.
- The molds were placed in a Polin oven at 170° C. for 11 minutes.
- The baked Soft Cake characteristics are shown in the table below:

|  | Control | HMT Flour Trial |
|---|---|---|
| Moisture | 15.4% | 15.9% |
| Water Activity | 0.7 | 0.7 |
| SDS | 13.4% | 16.5% |

This shows that the use of a HMT Refined Whole Brown Rice flour (Moisture: 20%—Heating: 100° C.—Heating time: 16 hours) in a soft cake allows an SDS value above 15%.

Example 3

This example shows the impact of treatment time of HMT flour settings on SDS content in soft cake by kind of flour.

The formula used was the same as in Example 2 above. The only differences relate to the kind of flour used.

| Flour | Heat Moisture Treatment Setting | | | SDS in baked soft cake (%) |
|---|---|---|---|---|
| | Moisture | Heating temperature | Heating time | |
| Refined Wheat Flour | 20% | 100° C. | 16 h | 11.1 |
| | 20% | 100° C. | 6 h | 10.5 |
| | 20% | 100° C. | 1 h | 6.8 |
| Control (Refined Wheat) | — | — | — | 4.9 |
| Whole Wheat Flour | 20% | 100° C. | 24 h | 8.3 |
| | 20% | 100° C. | 16 h | 9.8 |
| | 20% | 100° C. | 6 h | 8.3 |
| | 20% | 100° C. | 1 h | 5.4 |
| Control (Whole Wheat) | — | — | — | 5.1 |
| Whole Brown Rice Flour | 20% | 100° C. | 16 h | 16.5 |
| | 20% | 100° C. | 6 h | 17.1 |
| | 20% | 100° C. | 1 h | 16.3 |
| Control (Whole Brown Rice) | — | — | — | 13.4 |

For all of the above flour types, the use of an HMT process allows the provision of a higher SDS content. In particular, the provision of at least 6 hours of treatment gives high SDS when treating all flour types.

For refined wheat flour, a heating time between 6 and 16 hours to obtain the HMT flour has no impact on the SDS value. 1-hour treatment decreases the SDS value.

For whole Wheat Flour, a heating time between 6 and 24 hours to obtain the HMT flour has no impact on the SDS value. 1-hour treatment decreases the SDS value.

For whole Brown Rice Flour, a heating time between 1 and 16 hours to obtain the HMT flour have no impact on the SDS value.

Example 4

This example shows the on impact of heating temperature and moisture level of HMT flour settings on SDS content in a soft cake using whole brown rice. The recipe is as set out in the examples above.

| Flour | Heat Moisture Treatment Setting | | | SDS in baked soft cake (%) |
|---|---|---|---|---|
| | Moisture | Heating temperature | Heating time | |
| Whole Brown Rice Flour | 20% | 100° C. | 6 h | 17.1 |
| | 12% | 120° C. | 6 h | 17.0 |

For 6-hours heating time, the SDS value was the same in a soft cake with a HMT flour having a moisture between 12% and 20% and a heating temperature between 100° C. and 120° C.

Unless otherwise stated, all percentages herein are by weight.

Although preferred embodiments of the invention have been described herein in detail, it will be understood by those skilled in the art that variations may be made thereto without departing from the scope of the invention or of the appended claims.

The invention claimed is:

1. A method for the manufacture of a baked comestible product, the method comprising:
   i) forming and shaping a dough;
   ii) baking the shaped dough to form a baked comestible product, wherein the baked comestible product is a soft cake, and wherein the baked comestible product has a slowly digestible starch content of at least 10 wt %;
   wherein the dough comprises a pre-treated flour, the pre-treated flour consisting of wheat flour,
   wherein the slowly digestible starch content of the baked comestible product made from the pre-treated flour is increased relative to a control slowly digestible starch content of a control baked comestible product made with a non pre-treated flour instead of the pre-treated flour,
   and wherein the pre-treatment comprises:
   a) increasing a moisture content of a flour from an initial value to a value of from 12 to 25 wt % by weight of the flour;
   b) heating the flour in a sealed vessel to a temperature of from 80 to 120° C. for a period of at least 1 hour; and
   c) drying the flour to a final moisture content;
   wherein the final moisture content is in the range of +/−2 wt %, relative to the weight of the flour, of the initial value.

2. The method according to claim 1, wherein the soft cake has a water activity (Aw) of from 0.65 to 0.85.

3. The method according to claim 1, wherein the moisture content of the flour is increased to a value of from 18 to 22 wt %.

4. The method according to claim 1, wherein the moisture content of the flour is increased by adding water to the flour in a sealed vessel and allowing the flour and water to equilibrate.

5. The method according to claim 1, wherein the method further comprises milling the pre-treated flour.

6. The method according to claim 1, wherein the flour is heated to a temperature of about 100° C.

7. The method according to claim 1, wherein the flour is heated for a period of from 3 to 48 hours.

8. The method according to claim 1, wherein at least 50 wt % of a total flour content in the dough is the pre-treated flour.

9. The method according to claim 1 wherein the pre-treated flour comprises wholegrain wheat flour.

10. The method according to claim 1, wherein the baked comestible product has a slowly digestible starch content of at least 15 wt %.

11. A baked comestible product obtainable according to the method of claim 1, wherein the baked comestible product is a soft cake, comprising a continuous bakery portion and, optionally, one or more inclusions, wherein the continuous bakery portion has a total starch content comprising a slowly-digestible starch content (SDS), wherein the SDS is at least 10 wt % by weight of the product.

12. The baked comestible product of claim 11, comprising from 5 to 20 wt % fat; and/or less than 30 wt % sugar.

13. Use of a pre-treated flour in a dough to increase the slowly digestible starch (SDS) content of a baked comestible product to at least 10 wt %, the baked comestible product being a soft cake, wherein the pre-treated flour consists of wheat flour, and wherein the slowly digestible starch content of the baked comestible product made from the pre-treated flour is increased relative to a control slowly digestible starch content of a control baked comestible product made with a non pre-treated flour instead of the pre-treated flour, wherein the pre-treatment comprises:
a) increasing a moisture content of a flour from an initial value to a value of from 12 to 25 wt % by weight of the flour;
b) heating the flour in a sealed vessel to a temperature of from 80 to 120° C. for a period of at least 1 hour; and
c) drying the flour to a final moisture content;
wherein the final moisture content is in the range of +/−2 wt %, relative to the weight of the flour, of the initial value.

14. The method according to claim 1, wherein the moisture content of the flour is increased to a value of about 20 wt %.

15. The method according to claim 1, wherein the flour is heated for a period of from 6 to 24 hours.

16. The method according to claim 1, wherein at least 75 wt % of a total flour content in the dough is the pre-treated flour.

17. The method according to claim 1, wherein a total flour content in the dough is substantially entirely pre-treated flour.

18. The method according to claim 9, wherein the wholegrain wheat flour is in an amount of from 30 to 100 wt % by weight of a total flour content in the dough.

\* \* \* \* \*